Feb. 17, 1953  E. F. VERA  2,628,412
METHOD AND APPARATUS FOR CUTTING SYNTHETIC FIBER FABRICS
Filed May 27, 1950
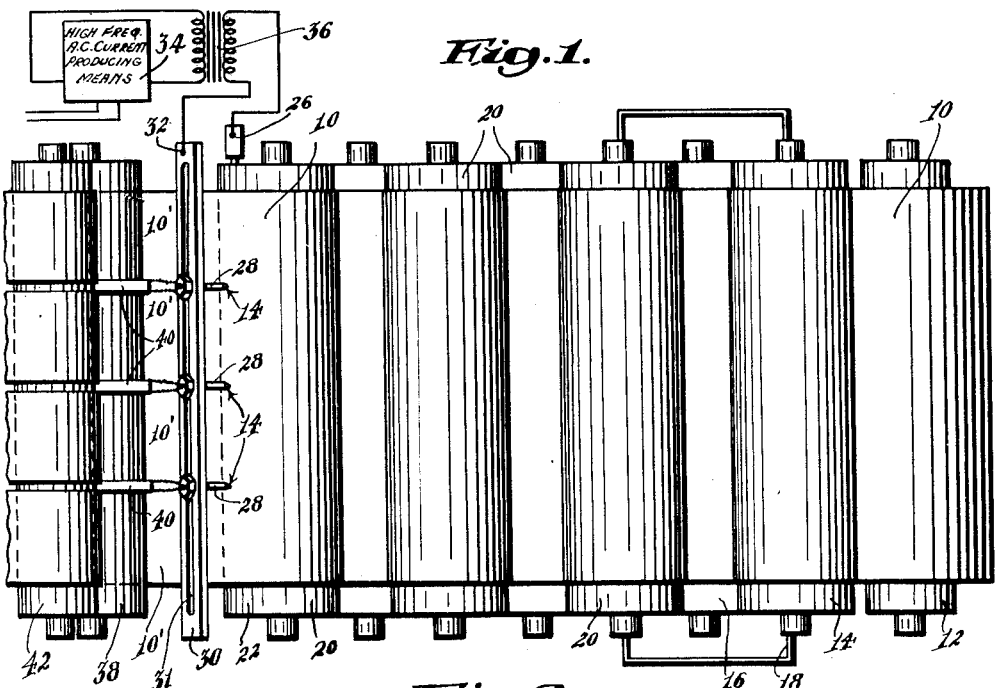
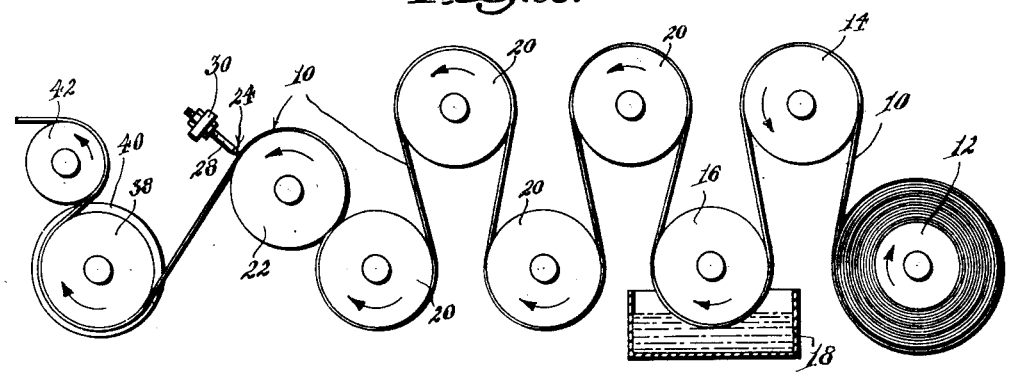
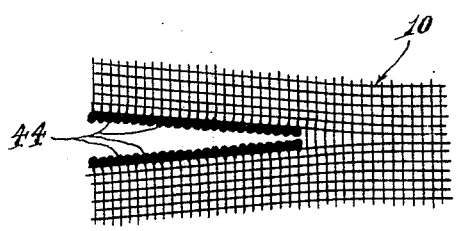
Inventor:
Edward F. Vera
by John K. McKenna
Attorney Patented Feb. 17, 1953

2,628,412

UNITED STATES PATENT OFFICE 2,628,412

METHOD AND APPARATUS FOR CUTTING SYNTHETIC FIBER FABRICS

Edward F. Vera, New Bedford, Mass., assignor to Hava Development Co., Inc., New Bedford, Mass., a corporation of Massachusetts Application May 27, 1950, Serial No. 164,652

7 Claims. (Cl. 28—72)

This invention relates to improvements in methods and apparatus for cutting fabrics made of synthetic fibres. More particularly it relates to a method and apparatus whereby synthetic fibre fabrics may be cut efficiently, effectively and speedily by a high frequency electric arc which severs the threads or fibres along the line of cutting and simultaneously fuses together the ends of the severed elements to provide a fibre-locking selvage or seal along each cut edge of the fabric.

It is well known in the textile art, and by manufacturers of items made of woven synthetic fibres, such as nylon and acetate rayon, that the inherent smooth, slippery and resilient nature of synthetic fibres is such that, when a fabric sheet woven of synthetic fibres is cut by conventional devices and methods, the fibres along the cut edges of the fabric tend strongly to slip out of their woven relation to adjacent fibres with the result that substantial areas of the fabric become useless unless the cut edges promptly are bound following any cutting. It has been necessary heretofore to carefully fold over the edges of the cut fabric and to stitch or baste along each folded edge in order to maintain the woven character and predetermined sizes and shapes of the cut pieces. Otherwise, the fabric tends to fall apart during handling of the cut fabric.

This prior requirement for immediate hemming or other binding of fibres along any cut edges of synthetic fibre fabrics greatly hampers manufacturing procedures and substantially increases costs of manufactured items over what these costs would be in absence of the edge-binding requirement. Also, because of the tendency of the cut fabric to start ravelling before the binding of the cut edges can be effectively bound, it has been difficult to ensure accuracy of dimensions and shape of cut patterns or other pieces.

It is among the objects of the present invention to provide a method of cutting fabrics woven of synthetic fibres whereby the fabric may be effectively cut by a high frequency electric arc which severs the synthetic fibres and simultaneously fuses together the cut ends of the fibres along each cut edge of the fabric thereby effectively locking the fibres in their woven condition.

Another object is to provide a method of cutting fabrics woven of synthetic fibre materials wherein a high frequency electric arc and a sheet of the fabric are moved relatively past each other with a rate of relative travel which has a predetermined relation to the frequency of the cutting arc and to the character of the particular fabric which is being cut. The invention provides for cutting the fabric at one or more points across the width of the fabric while the fabric is on a support which serves as one electrode of the high frequency electric circuit, one or more other electrodes being adjustably supported in suitably spaced relation to the fabric-supporting electrode so that the high frequency arc or arcs may sever the transverse fibres or threads in completing the circuit across the gap between electrodes. In a preferred procedure, the fabric travels past the arc or arcs and the cut edges of the fabric leave the support substantially at the instant of cutting and become separated laterally enough to avoid any subsequent fusing together of the cut edges.

A further object is to provide an apparatus for cutting fabric made of synthetic fibre wherein there is means for moving a sheet of the fabric and a high frequency electric arc relatively past each other with the fabric supported on one electrode of the high frequency circuit as the arc acts on the fabric to effect the cutting. The characteristics of particular fabrics which are to be cut determine the selection of a proper relationship between the frequency of the arc, the width of the arc gap, and the speed of relative travel of the fabric and arc, with the proper relationship providing a positive severing of the transverse fibres or threads and formation of a relatively narrow fibre-locking fused seal or selvage along each cut edge.

Yet another object is to provide apparatus for cutting fabric made of synthetic fibre material wherein an electric arc pulsates with high frequency between spaced electrodes of a high frequency electric circuit, and the fabric travels between the electrodes with the arc severing its transverse fibres or threads and simultaneously fusing together the cut fibre ends along each cut edge of the fabric.

It is, moreover, my purpose and object generally to improve upon prior fabric-cutting procedures and structures and more especially such procedures and apparatus for cutting fabrics woven of synthetic fibre materials.

In the accompanying drawings:

Fig. 1 is a top plan view of an apparatus for practicing the invention;

Fig. 2 is a side elevation of the apparatus of Fig. 1; and

Fig. 3 is an enlarged representation of a fragment of a sheet of synthetic fibre material illustrating the formation of the fused and sealed edges along a cut.

Referring to the drawings, a woven fabric sheet 10 made of synthetic fibre material, such as acetate rayon or nylon, is represented in Figs. 1 and 2 as being withdrawn from a supply roll 12. The particular apparatus illustrated is designed for cross-cutting sheet 10 into a plurality of strips 10' which may be wound on suitable individual spools (not shown), in any desired manner. Prior to cutting of the sheet, however, it preferably is passed over and under alternate ones of a series of drums of which drum 14 may be an idler to which the sheet leads from the supply roll 12, passing over drum 14 and thence downward around and under a drum 16 whose lower portion is immersed in water held in a receptacle 18. The wet sheet, leaving drum 16, passes upwardly over and around a steam drum 20 which is one of four similar steam drums 20 around which the sheet 10 passes before reaching the final drum 22 over which the sheet passes in reaching the cutting point or points indicated generally at 24.

As the sheet 10 passes around the various drums, it becomes ironed free of all wrinkles and comes to the final drum 22 in a smooth condition.

Metal drum 22 preferably will have a steel surface which is insulated from the remainder of the machine, and one terminal of a high frequency electric circuit is connected to its steel surface, as at 26, and the steel surface serves as one electrode of an arc gap between the surface of the drum 22 and an adjustable electrode 28 which conveniently may be mounted on a bar 30, or other support. As represented in Fig. 1, there are three similar electrodes 28 at spaced locations along the slot 31 of bar 30, each electrode 28 extending through the slot and there being means for individually securing each electrode 28 to the bar 30 at any desired location along its slot, whereby the illustrated three electrodes 28 may be selectively positioned relatively for cutting the sheet 10 into four strips 10' of predetermined widths. The second terminal of the high frequency electric circuit is shown connected to bar 30 as at 32, it being assumed in such case that bar 30 is of conducting material. Also, the electrodes may be adjusted on bar 30 to vary the extent of the gap between each and the drum electrode 22.

A simple high frequency circuit is shown diagrammatically in Fig. 1, it having a suitable source 34 of current which is supplied to a suitable step-up transformer 36 which, in turn, supplies the high frequency current for providing the high frequency arcs or sparks across the gap or gaps at 14, with resulting cutting of the synthetic transverse fibres or threads of sheet 10. Actually, in a commercial installation, a more complicated high frequency circuit will be preferable, such as a conventional radio-transmitting circuit with its conventional means for adjusting the frequency, and with its safeguards against interference with radio reception. However, the illustrated simple circuit can effect efficient cutting of woven synthetic fibre sheets as herein disclosed by selecting a proper speed of travel of sheet 10, and properly setting the length of the gap or gaps at 14.

It has been found that a frequency of approximately sixty megacycles is a preferred frequency for cutting the great majority of woven synthetic materials. Use of substantially higher frequencies produces too much fusing of the fibres at commercially practicable speeds of sheet travel. Frequencies substantially less than sixty megacycles are apt to result in some of the cross-fibres or threads passing without being severed. It should be understood, however, that a reasonable degree of variation of the frequency is permissible so long as the sheet material can be made to travel past the regions 14 of cutting at a rate which permits complete severance of each cross-fibre or thread while avoiding excessive fusing of the threads.

Maximum efficiency and effectiveness of the cutting is attained when the high frequency arcing or sparking occurs at a point or points on drum 22 where the sheet is just leaving the drum, and it is important that the cut ends of each thread be immediately separated following the cutting so that they cannot become fused together again. Hence, in Fig. 1, the strips 10', beyond the regions 14 of cutting, pass around portions of a roll 38 which are separated by the flanges 40 which act to spread the cut edges of the strips 10' apart as the strips advance to the roll 38. From roll 38, the cut strips are shown passing around the roll 42 whence they may go to individual windup spools or the like, not shown. Rolls 38, 42 may coact to draw the sheet 10 past the cutting regions 14, with the roll 38 constituting a driven roll.

It is a feature of the invention that my high frequency arc-cutting of woven synthetic sheet material is accompanied by an effecting sealing of each cut edge, as best illustrated in Fig. 3. As the arc severs each transverse fibre or thread of the sheet, the cut ends of each fibre or thread become melted or fused with the result that a small mass or globule 44 of fused synthetic material forms on the end of each severed fibre or thread. Adjacent ones of these globules 44 are so close to each other that they run together or contact each other while in the fused state, and subsequent solidification of the globules results in an effective locking together of the severed fibres or threads along each cut edge. Each cut edge becomes a sealed edge along which the united and solidified globules 44 provide an effective selvage, as clearly shown in Fig. 3, which also illustrates the earlier mentioned spreading apart of the cut edges to avoid re-fusing together of the ends of severed fibres or threads.

It will be apparent from the foregoing description, in connection with the drawing, that my improved method and apparatus effectively eliminates all need for folding and stitching the margins of cut pieces of woven synthetic fibre sheets. Also, according to my invention, such sheets may be cut with greater speed than heretofore, and with assurance that predetermined sizes and shapes for the cut pieces may be accurately attained.

It is intended that the patent shall cover by suitable expression in the appended claims, whatever features of patentable novelty exist in the invention disclosed.

I claim as my invention:

1. The method of cutting woven synthetic fibre sheet material, comprising arranging a sheet which is to be cut between two electrodes of a high frequency electrical circuit, moving the sheet and the electrodes relatively in the direction of the desired cutting thereby to move woven synthetic elements of the sheet in rapid succession into the gap between the electrodes, energizing the circuit to provide a high frequency arc across said gap for severing each said element coming into the gap and for fusing together the severed ends of successive elements along each cut edge of the sheet material.

2. The method of cutting woven synthetic fibre sheet material, comprising arranging a sheet which is to be cut between two electrodes of a high frequency electrical circuit, moving the sheet and the electrodes relatively in the direction of the desired cutting thereby to move woven synthetic elements of the sheet in rapid succession into the gap between the electrodes, energizing the circuit to provide a high frequency arc across said gap for severing said elements in succession as they advance into the gap and for fusing together the severed ends of successive elements along each cut edge of the sheet material, and spreading apart the severed ends of each severed element immediately upon the severing thereof for separating said fused together severed ends of successive elements along one cut edge of the sheet material from the similar fused together severed ends of successive elements along the other cut edge of the sheet material.

3. The method of cutting woven synthetic fibre sheet material, comprising generating a high frequency electric arc across a gap between two electrodes, moving a sheet which is to be cut through said gap to advance synthetic elements of the sheet in rapid succession to the fusing action of said arc whereby said elements are severed in rapid succession by said arc and severed ends of successive elements become fused together along each cut edge of the sheet material as the severed elements pass beyond the arc and while the two cut ends of each severed element are maintained in spaced relation.

4. The method of cutting woven synthetic fibre sheet material, comprising generating a high frequency electric arc across a gap between two electrodes, moving a sheet which is to be cut through said gap thereby to advance synthetic elements of the sheet in succession to the fusing action of said arc at a speed whereby each element becomes severed by the arc with formation of a fused mass of synthetic material on each cut end of each severed element, said fused masses on the cut ends of successive elements along each cut edge of the sheet material becoming merged while the severed ends of each said element are maintained in spaced relation, thereby to provide a continuous fused bead along each cut edge of the sheet material.

5. Apparatus for cutting woven synthetic fibre sheet material comprising a support for a sheet which is to be cut, said support having a metallic surface portion constituting one electrode of a high frequency electrical circuit, a second electrode spaced from said surface electrode whereby an arc gap is provided between them, means for generating a high frequency arc across said gap, means for moving a sheet which is to be cut through said gap at a predetermined rate of speed whereby said arc severs the woven synthetic elements of the sheet advancing in succession into said gap, and means beyond said arc maintaining the two severed ends of each severed element in spaced relation following its severance by the arc.

6. Apparatus for cutting woven synthetic fibre sheet material comprising a support for a sheet which is to be cut, said support having a metallic surface portion constituting one electrode of a high frequency electrical circuit, a second electrode spaced from said surface electrode whereby an arc gap is provided between them, means for generating a high frequency arc across said gap, means for moving a sheet which is to be cut through said gap at a predetermined rate of speed whereby said arc severs the woven synthetic elements of the sheet advancing in succession into said gap, and produces a fused globular mass of synthetic material on each severed end of each severed element, whereby all of said globular masses on one side of the line of severance unite and solidify into a continuous composite mass extending throughout the extent of one cut edge of the sheet material, and means for maintaining the globular masses at the other side of the line of severance in spaced relation to said united and solidified masses.

7. Apparatus for cutting and simultaneously sealing the cut edges of woven synthetic fibre sheet material comprising a pair of electrodes arranged to provide a gap between them, means for guiding a sheet which is to be cut through said gap, means for generating a high frequency arc across said gap thereby to fuse and sever synthetic elements of the sheet as they advance in succession into the action of the arc, and means for moving the sheet through said gap at a speed whereby the said fusing of the individual elements is arrested before it can proceed to any substantial linear extent along each element, said arresting of the fusing promoting formation of a globular mass of synthetic material on each severed end of each severed element, whereby the globular masses at one side of the line of severance join together to provide an ultimately solidified fibre-locking seal along a cut edge of the sheet material.

EDWARD F. VERA.

REFERENCES CITED

The following references are of record in the file of this patent:

UNITED STATES PATENTS

| Number | Name | Date |
| --- | --- | --- |
| 1,909,016 | Schulz | May 16, 1933 |
| 2,035,138 | Maxfield | Mar. 24, 1936 |
| 2,297,881 | Fuller | Oct. 6, 1942 |
| 2,346,195 | Spalding | Apr. 11, 1944 |
| 2,373,194 | Luttge | Apr. 10, 1945 |
| 2,388,144 | Headon | Oct. 30, 1945 |
| 2,425,123 | Quayle et al. | Aug. 5, 1947 |
| 2,432,485 | Newman | Dec. 9, 1947 |
| 2,510,383 | Dalgleish | June 6, 1950 |
| 2,513,838 | Beall | July 4, 1950 |
| 2,578,889 | Kennedy | Dec. 18, 1951 |